March 23, 1954     H. C. DRAKE     2,672,753
RAIL FLAW DETECTOR MECHANISM

Filed Sept. 17, 1949     4 Sheets-Sheet 1

INVENTOR.
HARCOURT C. DRAKE
BY Joseph H. Lipschutz
ATTORNEY.

March 23, 1954 — H. C. DRAKE — 2,672,753
RAIL FLAW DETECTOR MECHANISM
Filed Sept. 17, 1949 — 4 Sheets-Sheet 2

INVENTOR.
HARCOURT C. DRAKE
BY Joseph H. Lipschutz
ATTORNEY

March 23, 1954  H. C. DRAKE  2,672,753
RAIL FLAW DETECTOR MECHANISM
Filed Sept. 17, 1949  4 Sheets-Sheet 3
FIG. 3
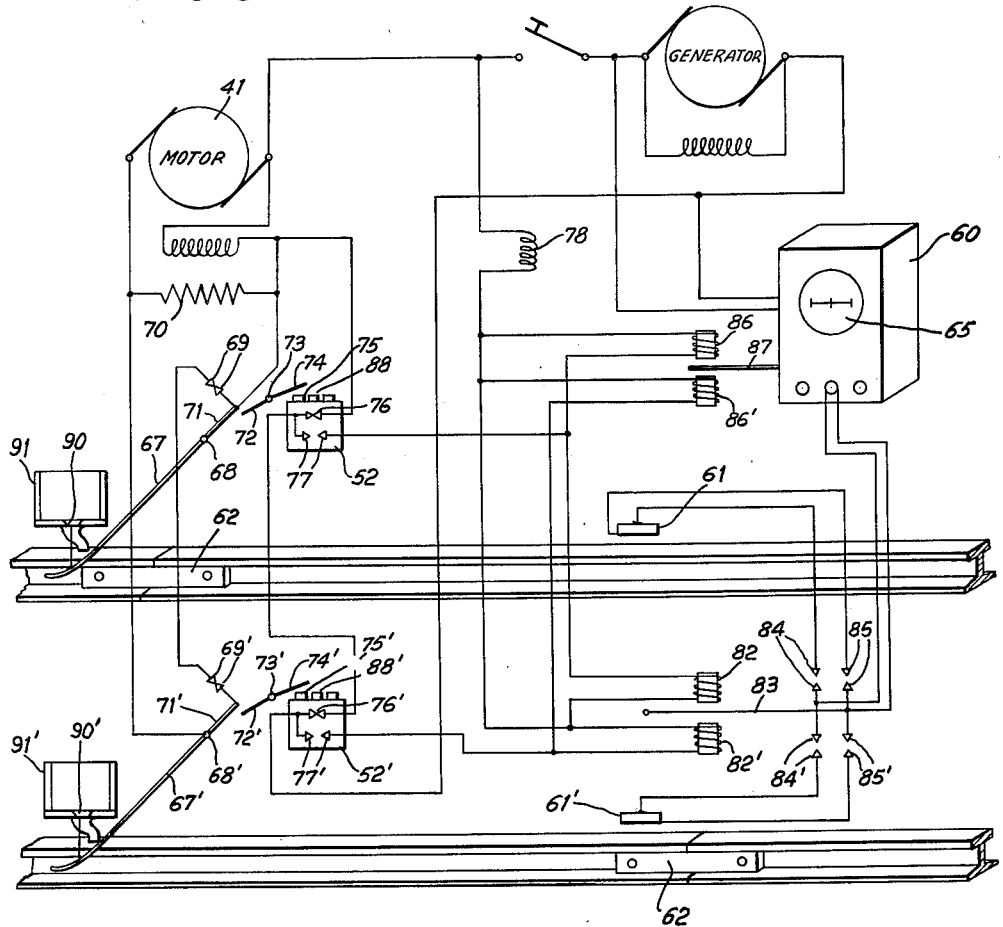
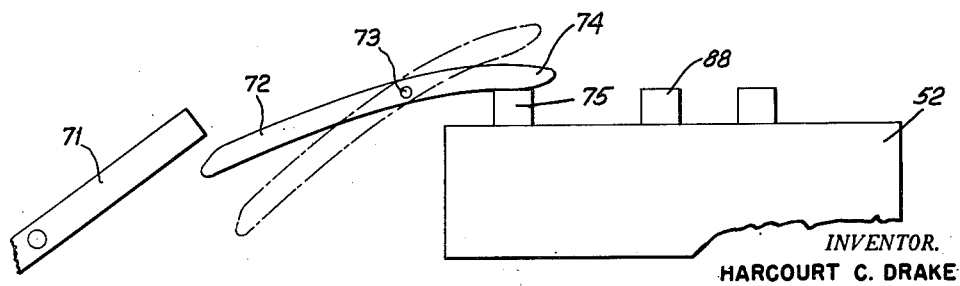
FIG. 4
INVENTOR.
HARCOURT C. DRAKE
BY Joseph H. Lipschutz
ATTORNEY.

March 23, 1954  H. C. DRAKE  2,672,753
RAIL FLAW DETECTOR MECHANISM
Filed Sept. 17, 1949  4 Sheets-Sheet 4

INVENTOR.
HARCOURT C. DRAKE
BY
*Joseph H. Lipschutz*
ATTORNEY.

Patented Mar. 23, 1954

2,672,753

UNITED STATES PATENT OFFICE 2,672,753

RAIL FLAW DETECTOR MECHANISM

Harcourt C. Drake, Hempstead, N. Y., assignor to Sperry Products, Inc., Danbury, Conn., a corporation of New York Application September 17, 1949, Serial No. 116,398

7 Claims. (Cl. 73—67)

This invention relates to a rail car adapted to travel over rails in track and to carry test equipment for the testing of rails by an operator. The car is particularly designed for the testing of the joint areas of the rails. It has been found possible to test these areas for defects, such as cracked bolt holes and other fissures and discontinuities, by means of an ultrasonic reflectoscope in which pulses of high frequency sound are transmitted into the rail, receiving reflections of these pulses and noting on an indicator, such as an oscilloscope, the time interval between the transmission and reception of the pulses. The rail test car herein described is particularly suited to carrying such ultrasonic testing equipment, but other test equipment may also be advantageously carried by such car.

Such a car as described above must have a plurality of attributes as follows:

(a) The car must be able to run light at relatively high speed to the region where testing is to be performed.

(b) Once the region of testing is reached the car must be able to proceed at relatively slow speed on the order of four feet per second along the rails between joints.

(c) When the joint area is reached the car must slow down.

(d) When the exact joint area of test is reached it may be desirable to stop the car entirely.

It is a principal object of this invention to provide a rail test car which is capable of performing all of these operations and which can perform operations (b), (c) and (d) automatically.

It is the purpose of a rail test car of the type described above to permit testing of a large number of joints in rapid succession. However, an operator would ordinarily suffer from fatigue in a very short time owing to the fact that the joints are close to the ground and he must kneel and bend over to effect such testing. Therefore, it is a further object of this invention to provide a rail test car as described with auxiliary mechanism which will permit an operator to perform the testing operation quickly and effectively without leaving the car and without the necessity of assuming a fatiguing position.

It is a further object to provide such auxiliary mechanism which will permit an operator to test the joints of both rails of a track in succession by giving him ready access to the rail at either side of the track.

Since, as described above, the operator shifts from side to side as he tests a joint in the rail at one side and then a joint in the rail at the other side, it is necessary to provide means whereby the indicating instrument is equally accessible to the operator in both positions. It is a further object of the invention to provide means whereby the indicating instrument is automatically adjusted to reading position for the respective rail under test.

It is another object of the invention to provide means whereby the rail joint area about to be tested will automatically be covered with an oil film to facilitate coupling between the piezo-electric searching unit and the rail, since such searching unit must be employed in connection with ultrasonic testing of the rail joint area.

Further objects and advantages of this invention will become apparent in the following detailed description thereof.

In the accompanying drawings,

Fig. 3 is a wiring diagram of the invention.

Fig. 4 is an enlarged detail of a trip mechanism for actuating a switch as shown in Fig. 3.

Figure 1:
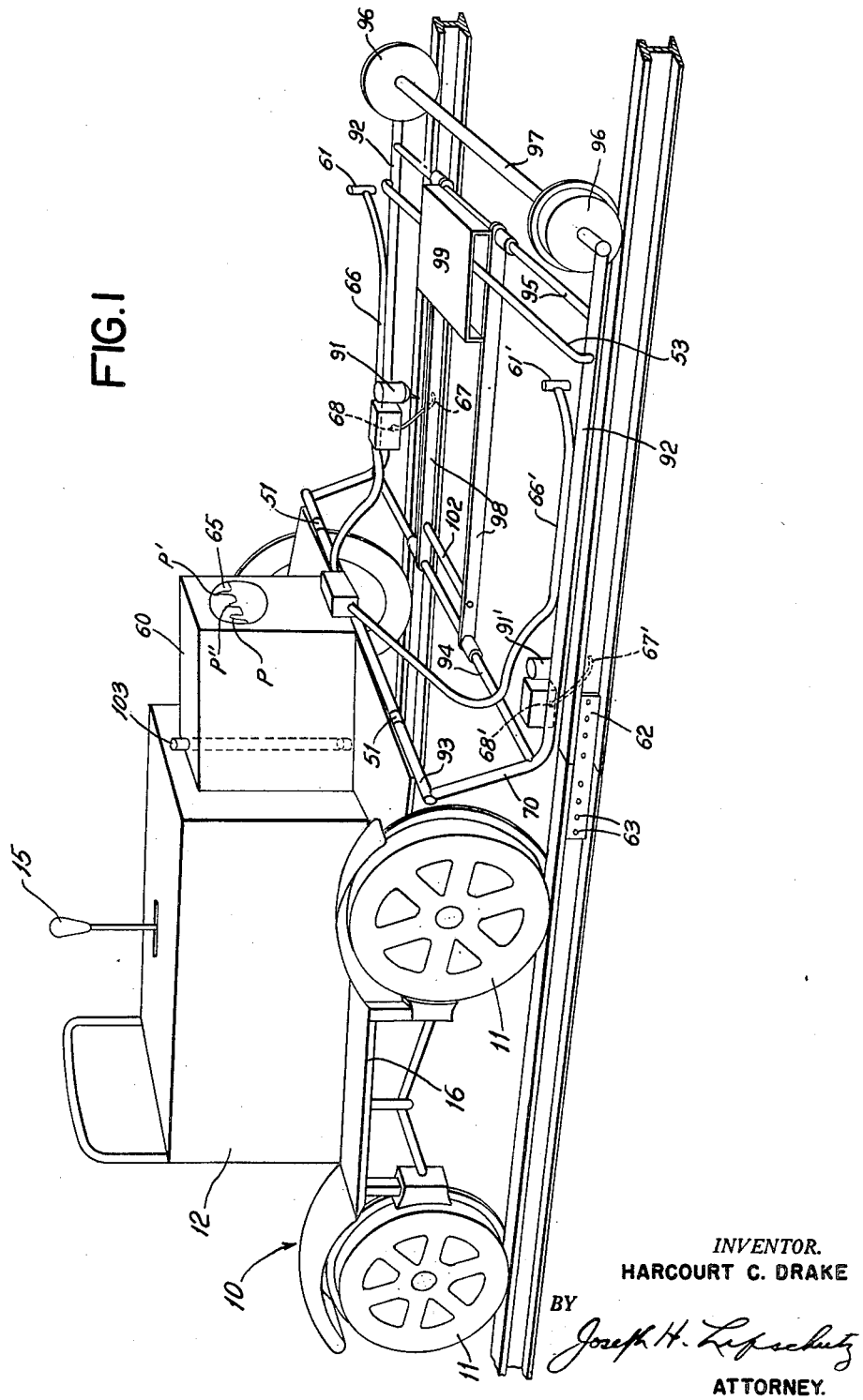
Fig. 1 is an isometric projection of one form of rail test car embodying my invention.
Figure 2:
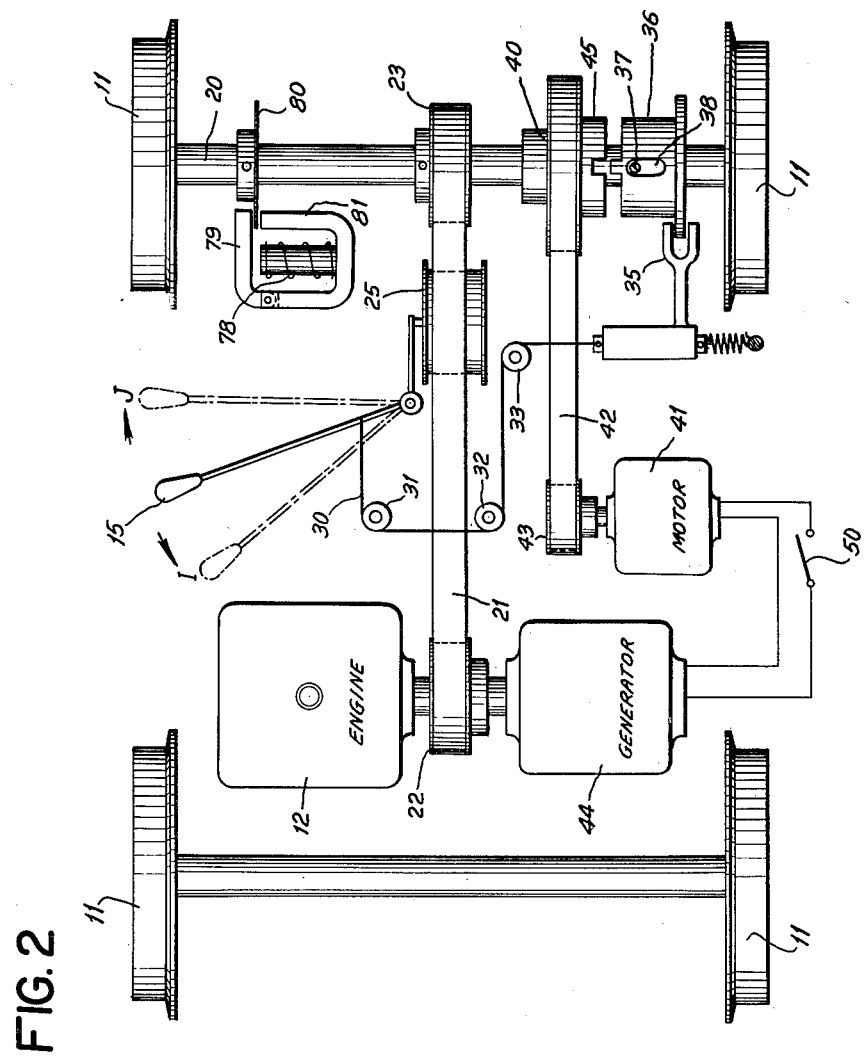
Fig. 2 is a plan view, with the operating handle turned 90 degrees from vertical position into horizontal position for purposes of illustration, of the driving and generating mechanism of the Fig. 1 car.

Referring to Fig. 1, there is disclosed a rail test car comprising a main body 10 mounted on flanged wheels 11 adapted to ride along the rails. The car body supports an internal combustion engine 12 and the movement of the car is controlled by handle 15 which may be operated by an operator standing upon a platform 16. The drive from engine 12 to the car axle 20 (see Fig. 2) may be effected by a belt 21 and pulleys 22 and 23, the latter pulley being fixed to car axle 20, when handle 15 actuates an idler pulley 25 to tighten or loosen the belt 21. When the handle 15 is actuated in the direction of arrow I the belt is tightened and the car is driven from the gasoline engine, but when the handle 15 is actuated in the direction of arrow J the belt is loosened and the engine is no longer effective to drive the car.

However, when the handle 15 is actuated to render the engine 12 ineffective to drive the car there is rendered effective an electric drive through the following mechanism: Movement of handle 15 in the direction of arrow J actuates a cable 30 over pulleys 31, 32, 33 to operate a shift member 35 which engages one clutch element 36 which is slidable on shaft 20 by means of pin and slot connection 37, 38 to engage the normally free-running pulley 40. This pulley is driven from an electric motor 41 through belt and pulley 42, 43, the electric motor being energized from generator 44 operated by engine 12. Thus when handle 15 is moved in the direction of arrow J to render engine 12 ineffective to drive shaft 20 directly, there is rendered effective an electric drive comprising generator 44 and motor 41 to drive the shaft 20 through clutch part 36 which engages clutch part 45 integral with the pulley 40. The circuit through the electric motor may be controlled by the operator by operating switch 50.

Thus in practice the operator would actuate handle 15 in the direction of arrow I to drive the car at a relatively fast speed to the region where testing is to take place. When such region is reached the operator will actuate handle 15 in the direction of arrow J to render the direct drive from engine 12 to axle 20 ineffective and to render the electric motor drive to said axle effective. The electric motor drive is geared down to a much slower rate, i. e., on the order of four feet per second as against the 30 miles per hour or more of the direct drive.

The particular testing instrument here employed is an ultrasonic reflectoscope, indicated at 60, which generates high frequency electrical pulses which are applied to a piezo-electric transducer such as a quartz crystal 61 which transforms the electric pulses into sound pulses. These sound pulses are transmitted into the rail and they proceed until they strike a reflecting surface which may be either a bounding surface of the rail or some discontinuity such as a fissure in the rail or a broken bolt hole in the joint region. The joint comprises angle bars such as 62 joining the ends of rails and having bolts 63 extending through the angle bars and the rail. The received reflected pulses are transformed by the crystal 61 into electric oscillations which are then indicated on the oscilloscope screen 65 which shows the transmitted pulse P, the reflection from a bounding surface of the rail P' and the reflection from a discontinuity P'' if such discontinuity exists. In the present instance the ultrasonic reflectoscope 60 is mounted on the car frame preferably on a pivot post 103 so that the screen can be turned to the right or left to facilitate reading by the operator when testing the right and left rails respectively. Means for automatically effecting such pivotal adjustment will be described hereinafter. A separate search unit 61, 61', each comprising a quartz crystal, is provided for each rail and is connected to the instrument by cables 66 and 66' which may be selectively and automatically connected to the reflectoscope 60 by means which will be described hereinafter.

The rail car having been driven by the direct engine drive at relatively high speed to the region of test, is now driven at the reduced speed of about four feet per second by the electric motor drive to enable the operator to test a rail joint on first one rail and then the other rail since these joints occur alternately. It is now necessary to slow down, or if desired and as will be described hereinafter, to stop the car to effect such testing. Preferably this operation is done automatically as the car proceeds along the rail at the relatively slow speed of the motor drive. For this purpose the car may be equipped with joint fingers 67 and 67' pivotally mounted at 68, 68' on a frame 70 which is pivotally mounted on the rear of the car at 51 for movement about a transverse axis. This frame 70, as will be described, has means for supporting the operator in testing position to enable him to test either rail without assuming a fatiguing position. When a joint finger reaches the projecting angle bar at a joint it will be swung about its pivot 68, 68' to open a set of contacts 69, 69' and place in the circuit of motor 41 a resistance 70 which cuts down the speed of the motor to any desired degree such as a speed at which the search elements 61, 61' could be moved along the rail in the joint area.

However if it is desired to stop the car for effecting a test, the following mechanism may be employed. When the joint finger reaches the angle bar 62 and is pivoted around its pivot 68, 68' to cut in resistance 70 and reduce the speed of motor 41, the opposite end 71, 71' of joint finger 67, 67' rides past a pivoted link 72, 72' pivotally mounted on a fixed pivot 73, 73' to raise the end 74, 74' of the respective link. When the car has proceeded far enough so that finger 67 rides off angle bar 72 at the leaving end, the upward movement of end 71, 71' of the joint finger will lower the end 74, 74' of the respective pivoted link 72, 72' and operate a switch button 75, 75' of a two-position switch 52, 52'. The actuation of button 75, 75' will open a set of contacts 76, 76' in the circuit of motor 41 to break the circuit through the motor and thus cause the car to come to a stop. The position of the finger 67, 67' relative to the rail test car is such that the contacts 76, 76' will be open when the car has ridden beyond the angle bar a sufficient distance to bring the operator close to the joint bar region. To accomplish such stopping more effectively, a pair of contacts 77, 77' may be closed when the respective contacts 76, 76' are open and said contacts may energize an electromagnet 78 which will attract an armature 79 (see Fig. 2) to press a disk 80 between the armature 79 and a magnet 81 and thus effect braking.

If the rail is the upper one shown in Fig. 3, the operator will then place the crystal 61 on the rail and by passing the crystal over the joint area along the rail treads will discover any discontinuities as indicated on the oscilloscope screen 65. If the joint at the other side as shown in the lower rail in Fig. 3 is to be tested, the operator uses the crystal 61'. Means are provided whereby either of these search units 61 or 61' may be connected to the reflectoscope 60 automatically by the action of the joint finger in engaging the respective angle bar. Thus when joint finger 67 is tilted about its pivot 68 in engagement with the angle bar, and on leaving the angle bar is again tilted so as to operate switch button 75 to open contacts 76 through the motor and close contacts 77, the closing of contacts 77 in addition to energizing the coil 78 of the electric brake may also energize a coil 82 to attract armature 83 and close sets of contacts 84 and 85. Closure of sets of contacts 84 and 85 will connect the crystal 61 with the reflectoscope 60. At the same time that the closing of contacts 77 energizes coils 78 and 82 it will also energize a coil 86 to attract armature 87 connected to the reflectoscope casing 60 to swing said casing about its pivot 103 so that it faces the operator.

When the operator has finished his testing of the joint, he pushes the switch button 88 or 88' which opens contacts 77 and closes contacts 76 thus energizing motor 41, and since resistance 70 is short-circuited the car will proceed at the four feet per second rate to the next joint in the rail on the opposite side. When this joint is reached joint finger 67' will duplicate the same sequence of operations as hereinabove described as following the engagement of finger 67 with the angle bar to open contacts 76' when the joint finger leaves the angle bar and close contacts 77'. This will stop the motor and will energize brake coil 78 and coil 82' to connect search unit 61' with the reflectoscope through sets of contacts 84', 85'. It will also energize coil 86' to swing the oscilloscope screen in a direction to face the operator at the other side of the rail.

As a joint finger 67 or 67' engages the respective angle bar it may open the valve 90, 90' of an oil reservoir 91, 91' to permit oil to flow on the surface of the rail as the joint finger travels over the angle bar. When the joint finger leaves the angle bar the valve 90, 90' is closed and the oil is cut off. The oil serves as a couplant to enable the ultrasonic waves generated by the crystal to be transmitted into the rail with a minimum of attenuation.

To permit an operator to perform the testing operations at each side of the track without the necessity of getting down on hands and knees and bending over the rail—operations which have been found to be extremely fatiguing—there is provided on the rear end of the car frame the pivoted frame which consists of side members 92 and cross members 93, 94, 95. Said frame may be supported on wheels 96 which ride on the rail and through which extends shaft 97 to the ends of which the side frame members 92 are connected. The entire frame is pivotally mounted on the rear of the car truck by having the cross member 93 pivotally supported in suitable bearings 51 on the rear of the truck member so that the entire frame may be swung up around pivotal axis 93 when not in use. On the cross members 94 and 95 there is mounted for lateral sliding movement a carriage consisting of longitudinal members 98 slidable on cross bars 94 and 95. The cross bars 98 are fastened together by a member 99 which may be in the form of an operator's seat so that the members 98 and 99 constitute a laterally movable carriage which can move from one side of the track to the other so that an operator sitting on seat 99 can easily move himself into operative relation with the rail at his right or left without leaving his seat. Also this carriage can move sufficiently far to either side so that in the extreme position the operator can even place one leg on the ground outside the rail while the other leg is inside. This enables him to shift his position within a considerable range and is very instrumental in preventing fatigue. Another major factor in preventing fatigue is, of course, that he may remain seated and does not have to get down on hands and knees as was heretofore the case. The distance from cross bar 94 to the seat 99 is such that the operator may keep his feet on a cross bar 102 when the truck is traveling. The two search units 61 and 61' are supported on the lateral cross bars 92 for easy access by the operator. The pivoted fingers 67 and 67' are also carried by the side bars 92. The switch 50 which controls the motor energization is placed within easy reach of the operator while seated on seat 99. A laterally-extending hand-rail 53 fixed to side rails 92 may extend through seat 99 so that the operator can move himself from side to side by grasping and pulling on the hand-rail.

Figure 5:
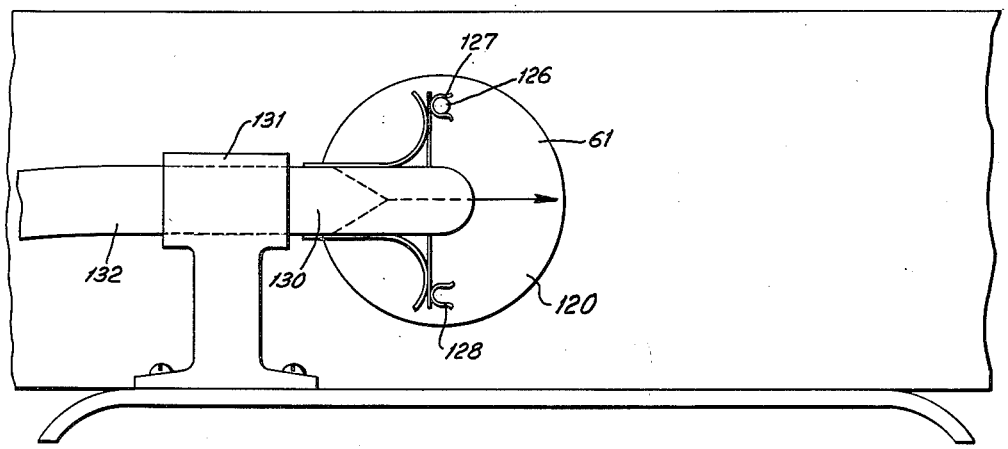
Fig. 5 is a plan view of a piezo-electric transducer and its support.
Figure 6:
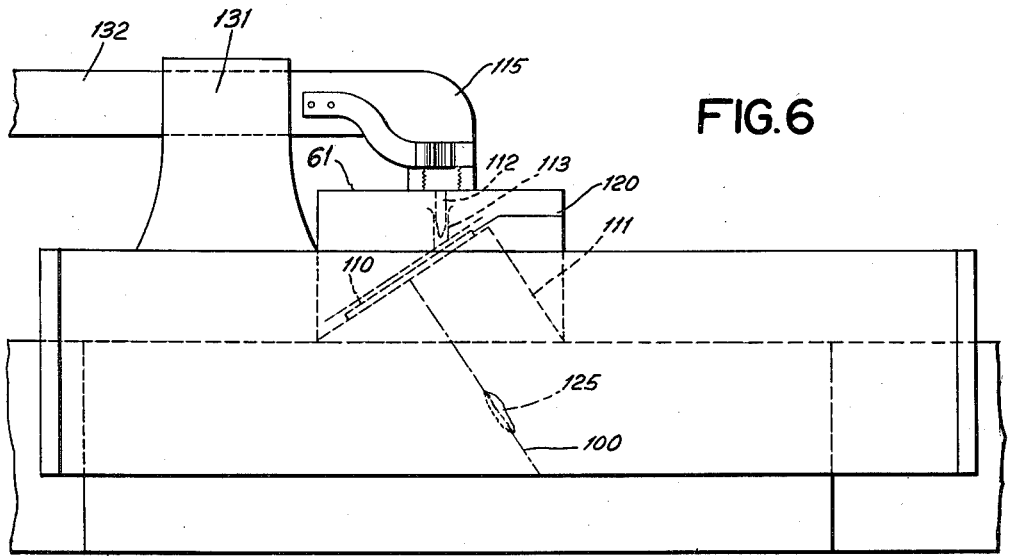
Fig. 6 is a front elevation of the Fig. 5 mechanism.

The search elements 61, 61' comprising the quartz crystal may take the form disclosed in Figs. 5 and 6. In this form a crystal 110 may be mounted on a wedge-shaped block 111 of some material such as plastic which will transmit the vibrations of the crystal 110 into the rail at a suitable angle. This angle may be as shown by the dash line 100 in Fig. 6. The electric connection to the crystal may comprise a center electrode 112 engaging a spring clip electrode 113, and an electric connection 115 to the other side of the circuit. By this arrangement it will be seen that the crystal and its supporting casing 120 may be swung around the pivotal connection 112, 113 without disturbing the electrical connection and this will permit sending the beam into the rail at a different angle from the first beam. Thus if a discontinuity as indicated at 125 is in the line 100 of propogation of the wave train it will not produce a backward reflection and will be missed. But if the casing 120 is turned for example through 180 degrees it will be observed that the discontinuity 125 will now form a reflecting surface which will reflect the beam. Thus a discontinuity which might otherwise be missed can be detected by positioning the angle transmitting crystal in different positions. To facilitate such movement to different testing positions the casing 120 may be provided with a pin 126 which may engage in either of two spring clips 127 or 128 supported by an arm 130 connected to the fixed post 131 through which the cable 132 leading to the reflectoscope extends.

Having described my invention, what I claim and desire to secure by Letters Patent is:

1. In combination, a rail test car adapted to travel over tracks comprising rails connected by joints, said car having propelling means, and a support for an operator, said support being mounted at its forward end on the rear of the car, a seat for an operator, and means on said support for mounting said seat at a predetermined height above the rails for lateral movement so that said seat may be moved to bring the operator selectively into working position adjacent to either rail of the track, said car having means for effectively stopping the same, means responsive to the rail joints, and means actuated by said joint responsive means for actuating said car stopping means, said joint responsive means being positioned relative to the car and said support so that the car is stopped when said seat is adjacent to the joint.

2. In an ultrasonic rail joint test mechanism, a car adapted to travel over track comprising rails connected by joints, means for propelling the car, an ultrasonic instrument comprising a wave generator and receiver mounted on said car for movement about a vertical axis, joint responsive means supported on said car and cooperating with each rail so as to be actuated by the joints in the respective rail, a pair of actuating members for selectively moving said instrument about said vertical axis in either of two directions to cooperate with the respective rails, and means actuated by the respective joint responsive means when in predetermined relation to the joint for operating the respective actuating member to swing said instrument into working position adjacent to the corresponding rail.

3. In an ultrasonic rail joint test mechanism, a car adapted to travel over track comprising rails connected by joints, means for propelling the car, an ultrasonic instrument comprising a wave generator and receiver mounted on said car for movement about a vertical axis, an electro-acoustic transducer for each rail of the track, said transducer being normally disconnected from said instrument, joint responsive means supported on said car and cooperating with each rail, and means actuated by the joint responsive means of each rail when in predetermined relation to the joint for connecting to the instrument the respective transducer cooperating with the corresponding rail.

4. In an ultrasonic rail joint test mechanism, a car adapted to travel over track comprising rails connected by joints, means for propelling the car, an ultrasonic instrument comprising a wave generator and receiver mounted on said car for movement about a vertical axis, an electro-acoustic transducer for each rail of the track, said transducer being normally disconnected from said instrument, joint responsive means supported on said car and cooperating with each rail, means actuated by the joint responsive means of each rail when in predetermined relation to the joint for connecting to the instrument the respective transducer, and means actuated by the respective joint responsive means when in predetermined relation to the joint for swinging said instrument into working position adjacent to the corresponding rail.

5. In an ultrasonic rail joint test mechanism, a car adapted to travel over track comprising rails connected by joints, means for propelling the car, an ultrasonic instrument comprising a wave generator and receiver mounted on said car for movement about a vertical axis, an electro-acoustic transducer for each rail of the track, said transducer being normally disconnected from said instrument, joint responsive means supported on said car and cooperating with each rail, and means actuated by the joint responsive means of each rail when in predetermined relation to the joint for connecting to the instrument the respective transducer cooperating with the corresponding rail, each of said transducers comprising a casing adapted to engage the rail tread, a piezo-electric crystal in said casing, a support for said crystal inclined at an angle to the rail whereby the vibrations of the crystal are transmitted into the rail in a direction inclined to the vertical, and means for mounting said casing for movement about a vertical axis whereby the vibrations of said crystal may be transmitted into the rail in a direction opposite to said first direction.

6. A rail test car adapted to travel over track comprising rails connected by joints, an ultrasonic instrument supported on said car and comprising a wave generator and receiver, a piezo-electric element connected to said instrument and adapted to engage the rail surface, a reservoir supported on said car and containing a supply of a couplant for facilitating transmission of ultrasonic waves between the piezo-electric element and the rail with minimum attenuation, and means for controlling the flow of couplant from the reservoir, said last-named means comprising joint responsive means supported on said car and cooperating with the rail, and means for actuating said controlling means by the joint responsive means when the joint responsive means is in predetermined relation to the joint to supply couplant to the joint.

7. A rail test car adapted to travel over track comprising rails connected by joints, an ultrasonic instrument supported on said car and comprising a wave generator and receiver, a piezo-electric element connected to said instrument and adapted to engage the rail surface, a reservoir supported on said car and containing a supply of a couplant for facilitating transmission of ultrasonic waves between the piezo-electric element and the rail with minimum attenuation, valve means for controlling the flow of couplant, joint responsive means supported on said car, and means actuated by said joint responsive means for opening said valve when said joint responsive means is passing over the region of the joint and for closing the valve when the joint responsive means has passed beyond the region of the joint.

HARCOURT C. DRAKE.

References Cited in the file of this patent

UNITED STATES PATENTS

| Number | Name | Date |
|---|---|---|
| 1,124,002 | Fay | Jan. 5, 1915 |
| 1,124,185 | Thomas et al. | Jan. 5, 1915 |
| 1,130,657 | Armstrong | Mar. 2, 1915 |
| 1,670,007 | Rasmussen et al. | May 15, 1928 |
| 2,011,416 | Perry | Aug. 13, 1935 |
| 2,160,540 | Drake | May 30, 1939 |
| 2,280,226 | Firestone | Apr. 21, 1942 |
| 2,463,328 | Sproule | Mar. 1, 1949 |
| 2,514,249 | Madsen | July 4, 1950 |